(12) United States Patent
Csik

(10) Patent No.: US 6,854,941 B2
(45) Date of Patent: Feb. 15, 2005

(54) CLIP NUT

(75) Inventor: Terrence S. Csik, Pasadena, CA (US)

(73) Assignee: The Monadnock Company, Inc., City of Industry, CA (US)

( * ) Notice: Subject to any disclaimer, the term of this patent is extended or adjusted under 35 U.S.C. 154(b) by 0 days.

(21) Appl. No.: 10/409,869

(22) Filed: Apr. 9, 2003

(65) Prior Publication Data

US 2004/0202523 A1 Oct. 14, 2004

(51) Int. Cl.[7] ............................................. F16B 39/284
(52) U.S. Cl. ..................................... 411/112; 411/111
(58) Field of Search .................... 411/111, 112, 174, 411/175, 104

(56) References Cited

U.S. PATENT DOCUMENTS

| | | |
|---|---|---|
| 2,255,469 A | 9/1941 | Kost |
| 2,477,429 A * | 7/1949 | Swanstrom et al. ........ 411/111 |
| 2,861,618 A | 11/1958 | Tinnerman |
| 2,875,805 A * | 3/1959 | Flora ........................... 411/111 |
| 3,670,796 A | 6/1972 | Grimm |
| 4,074,491 A | 2/1978 | Bell et al. |
| 4,113,292 A | 9/1978 | Gauron et al. |
| 4,219,064 A | 8/1980 | Lozano |
| 4,296,586 A | 10/1981 | Heurteux |
| 4,375,933 A | 3/1983 | Hassler et al. |
| 4,396,326 A | 8/1983 | McKinnie, III et al. |
| 4,439,078 A | 3/1984 | Dessouroux |
| 4,676,706 A | 6/1987 | Inaba |
| 4,684,305 A | 8/1987 | Dubost |
| 4,729,706 A | 3/1988 | Peterson et al. |
| 4,768,907 A | 9/1988 | Gauron |
| 4,830,557 A | 5/1989 | Harris et al. |
| 4,875,816 A | 10/1989 | Peterson |
| 4,948,316 A | 8/1990 | Duran et al. |
| 4,973,208 A | 11/1990 | Gauron |
| 5,026,235 A | 6/1991 | Muller et al. |
| 5,039,264 A | 8/1991 | Benn |
| 5,096,350 A | 3/1992 | Peterson |
| 5,193,643 A | 3/1993 | McIntyre |
| 5,378,099 A | 1/1995 | Gauron |
| 5,423,646 A | 6/1995 | Gagnon |
| 5,538,377 A | 7/1996 | Stewart et al. |
| 5,603,594 A | 2/1997 | Lincoln |
| 5,605,353 A * | 2/1997 | Moss et al. ................. 280/784 |
| 5,624,319 A | 4/1997 | Golczyk et al. |
| 5,630,686 A * | 5/1997 | Billmann ..................... 411/112 |
| 5,632,582 A | 5/1997 | Gauron |
| 5,738,477 A | 4/1998 | McCorkle et al. |
| 5,893,694 A | 4/1999 | Wilusz et al. |
| 6,146,071 A | 11/2000 | Norkus et al. |
| 6,287,064 B1 | 9/2001 | Jhumra et al. |
| 6,357,980 B1 | 3/2002 | Lansinger |
| 6,474,917 B2 | 11/2002 | Gauron |
| 6,644,902 B1 * | 11/2003 | Cutshall ..................... 411/111 |

FOREIGN PATENT DOCUMENTS

EP          0407282 A1 * 6/1990   ........... F16B/37/04

* cited by examiner

*Primary Examiner*—William L. Miller
(74) *Attorney, Agent, or Firm*—Sheppard, Mullin, Richter & Hampton LLP

(57) ABSTRACT

A clip nut is provided having a plastic body holding captive a nut. The body includes two aligned arms projecting from an aft section, each arm defining an aperture at a forward portion of the arm. The nut includes a base and a upstanding portion extending from the base that defines an internally threaded bore. The body further includes a nut cage positioned disposed about the aperture of the first arm. The nut cage includes an upper wall spaced above the first arm that defines a slot having a narrowed inlet and a recess aligned with the apertures of the first and second arms. The body is configured to readily and securely receive the nut. To insert the nut into the cage, the nut is forced against the nut cage such that the upstanding portion presses into and past the narrowed inlet. In this manner, the cage yieldably receives the nut without undue manipulation of either piece.

16 Claims, 3 Drawing Sheets

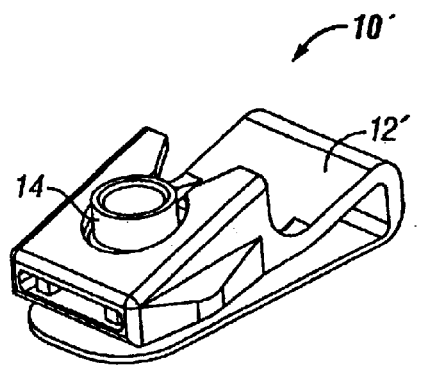
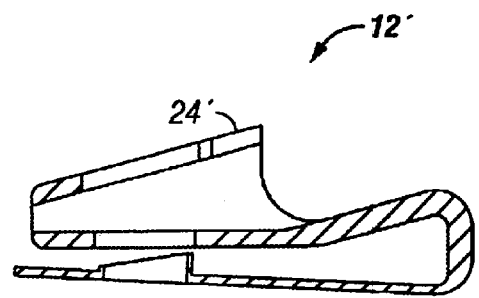
FIG. 7  FIG. 8
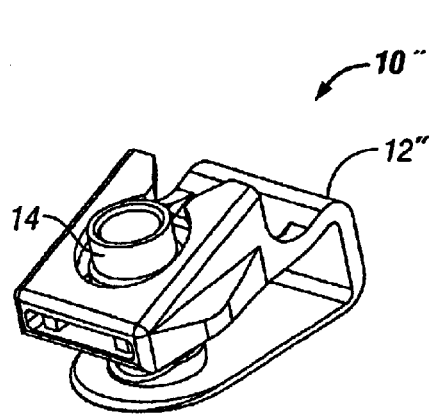
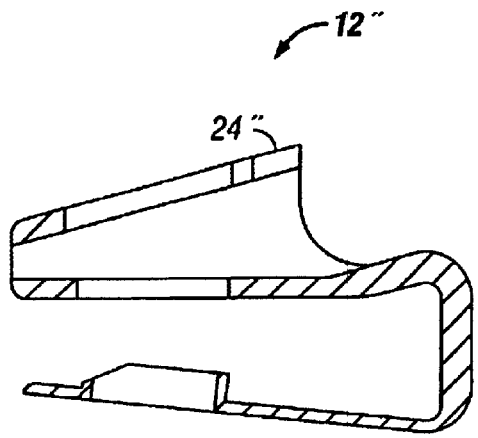
FIG. 9  FIG. 10

CLIP NUT

BACKGROUND OF THE INVENTION

This invention relates generally to fasteners and, more particularly, to clip nut fasteners.

Clip nuts are typically configured to slide over an edge of a panel to align a nut with a hole defined in the panel for receiving a bolt, screw or other threaded devices through the hole. Various such clip nuts are known and are typically used to mount items to the panel and for attaching panels together. Common applications for such clip nuts includes use in assembling automobiles, appliances and aircraft. For example, in assembling a single commercial aircraft hundreds of thousands of clip nuts can be used.

Although current approaches are generally effective, certain drawbacks exist. For example, certain clip nuts can mar the panel and can require relatively excessive assembly and installation time. Also, durability and load capability are important considerations, and certain clip nuts are insufficiently structured to secure and maintain its nut under high loads. Moreover, as such clip nuts are commonly used in very high volumes, improvements in ease of use can result in relatively substantial cost savings over time.

It should, therefore, be appreciated that there exists a need for a clip nut that is non-marring, has a high load capability, and is cost-effective to manufacture and use. The present invention fulfils this need and others.

SUMMARY OF THE INVENTION

The present invention is embodied in a clip nut having a plastic body holding captive a nut. The body includes two aligned arms projecting from an aft section, each arm defining an aperture at a forward portion of the arm. The nut includes a base and an upstanding portion extending from the base that defines an internally threaded bore. The body further includes a nut cage positioned disposed about the aperture of the first arm. The nut cage includes an upper wall spaced above the first arm that defines a slot having a narrowed inlet and a recess aligned with the apertures of the first and second arms. The body is configured to readily and securely receive the nut. To insert the nut into the cage, the nut is forced against the nut cage such that the upstanding portion presses into and past the narrowed inlet. In this manner, the cage yieldably receives the nut without undue manipulation of either piece.

In a detailed aspect of a preferred embodiment, the nut cage has a front wall extending upwardly from a portion forward of the aperture of the first arm and a pair of side walls extending upwardly from opposing sides of the first arm, and the upper wall is positioned atop the front and side walls.

In another detailed aspect of a preferred embodiment, the narrowed inlet is defined to have a width less than an outer diameter of a corresponding region of the nut's upstanding portion, such that the nut cage must deflect for the nut to pass through the narrowed inlet to the recess. The upper wall of the nut cage may further include a pair of inwardly facing protuberances in confronting relationship to define the narrowed inlet, each protuberance has a leading edge and the leading edges are generally symmetrical to one another about a line bisecting the narrowed inlet.

In yet another detailed aspect of a preferred embodiment, the leading edges of the protuberances each include a first portion angled toward the bisecting line, and a second portion generally parallel to the bisecting line and positioned between the first portion and the recess, wherein the recess has a generally circular cross-section as viewed from above the nut cage. Preferably, the closest distance between the leading edges of the protuberances is less than the diameter at a corresponding region of the upstanding portion of the nut, such that the nut cage must deflect for the nut to pass through the narrowed inlet of the slot.

In yet another detailed aspect of a preferred embodiment, the first arm includes a rearward portion angled relative to the forward portion of the first arm, and the upper wall of the nut cage is generally parallel to the rearward portion of the first arm.

Other features and advantages of the invention will become apparent from the following description of the preferred embodiments, taken in conjunction with the accompanying drawings, which illustrate, by way of example, the principles of the invention.

BRIEF DESCRIPTION OF THE DRAWINGS

Embodiments of the present invention will be described, by way of example only, with reference to the following drawings in which:

FIG. 7 is perspective view of a second preferred embodiment of clip nut in accordance with the present invention, depicting a body and a nut positioned in a nut cage of the body.

FIG. 8 is a cross-sectional view of the body of FIG. 7.

FIG. 9 is perspective view of a third preferred embodiment of clip nut in accordance with the present invention, depicting a body and a nut positioned in a nut cage of the body.

FIG. 10 is a cross-sectional view of the body of FIG. 9.

DETAILED DESCRIPTION OF THE PREFERRED EMBODIMENTS

Figure 1:
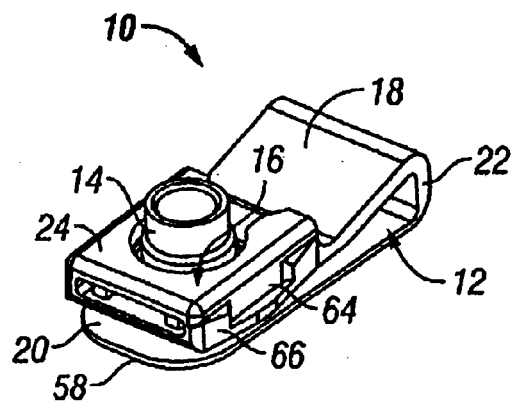
FIG. 1 is a perspective view of a first preferred embodiment of clip nut in accordance with the present invention, depicting a body and a nut positioned in a nut cage of the body.

With reference now to the illustrative drawings, and particularly FIG. 1, there is shown a clip nut 10 having a plastic body 12 and a nut 14 secured within a nut cage 16 of the body. The body includes first and second arms 18, 20 that extend from an aft section 22. The nut cage includes an upper wall 24 spaced above the first arm that defines a slot 26 having a narrowed inlet 28 and a recess 30. The nut includes a base 32 and an upstanding portion 34. The body is configured to readily and securely receive the nut. To insert the nut into the cage, the nut is forced against the nut cage such that the upstanding portion presses into and past the narrowed inlet. In this manner, the cage yieldably receives the nut without undue manipulation of either piece.

Figure 2:
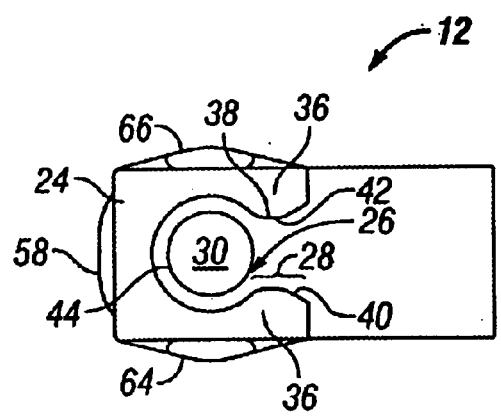
FIG. 2 is a top plan view of the body depicted in FIG. 1.
Figure 5:
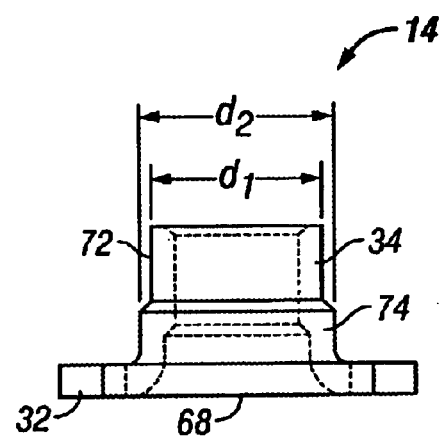
FIG. 5 is an elevational view of the nut depicted in FIG. 1.

With reference now to FIG. 2, the narrowed inlet 28 of the slot 36 is defined by a pair of protuberances 36 in confronting relationship. The protuberances are generally symmetrical to one another about a line bisecting the narrowed inlet, and each has a leading edge 38 that together define the narrowed inlet. The closest distance between the leading edges of the protuberances is such that the nut cage must deflect for the nut to pass through the narrowed inlet of the slot. A first portion 40 of each leading edge is angled toward the bisecting line to facilitate in aligning and receiving the nut into the cage. A second portion 42 of each leading edge is generally parallel to the bisecting line and positioned between the first portion and the recess 30. The distance between the second portions is less than outer diameter ($d_1$) of the upstanding portion of the nut (FIG. 5). The recess has a generally circular cross-section, as viewed from above the nut cage 16, and is sized to allow the nut to float within the nut cage.

Figure 3:
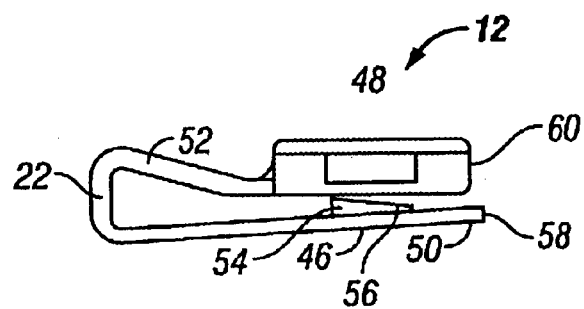
FIG. 3 is a side elevational view of the body depicted in FIG. 1.

With reference now to FIG. 3, the body 12 is preferably formed as one piece from a strong and flexible plastic material such as Torlon®, a polyamide-imide resin reinforced with fibers, manufactured by Amoco Performance Products, Inc. The first and second arms 18, 20 of the body both define apertures 44, 46 in forward portions the arms 48, 50, respectively. The apertures are aligned with each other and with the recess 30 of the nut cage 16 to allow a bolt, or another threaded securement device, to extend through the apertures and engage the nut 14. The first arm has a rearward portion 52 angled relative to the forward portion. The rearward portion is connected to the aft section 22 of the body and, in this embodiment, the rearward portion and the aft section are thicker than the first arm.

The second arm 20 includes an upstanding flange 54 encircling the aperture of the second arm. The flange aids in aligning the clip nut within an aperture of a mounting panel (not shown), as well as, withstanding forces exerted on the clip nut by the bolt. The flange has a forwardly sloping upper surface 56, which facilities easy placement of the clip nut onto the working panel. In this embodiment, the second arm is generally planar throughout its length and its leading edge 58 is rounded. This aids in maintaining a relatively large contact area with the panel to which it is mounted to distribute load and avoid marring.

With reference again to FIG. 1, the nut cage 16 has a front wall 60 that defines a recess sized to receive a laterally projecting portion 62 of the base of the nut. The front wall extends upwardly from the forward edge of the first arm and a pair of side walls 64 extend upwardly from opposing sides of the first arm. The upper wall 24 is positioned atop the front and side walls, creating an enclosure for the nut. The nut cage is configured to allow the nut float within the cage. This facilitates interaction between the nut and the bolt. In this embodiment, the upper wall of the nut cage is substantially parallel with the forward portion of the first arm. The nut cage is configured to bear and to distribute force imparted by the nut. For example, the upper wall is provided with sufficient structure to yieldably receive the nut into the nut cage without undue wear. Also, the nut cage is sufficiently structured to maintain the nut captive even in light of torquing and other forces exerted on the nut by the bolt. In this embodiment, the nut cage further includes side flanges 66 that add additional support to the side walls.

Figure 4:
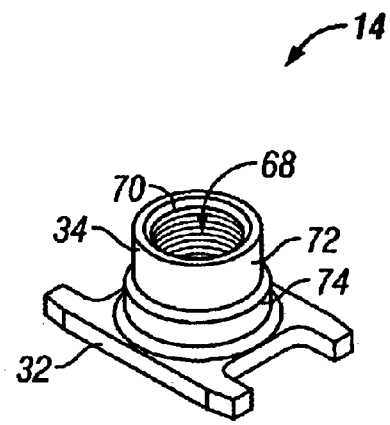
FIG. 4 is a perspective view of the nut depicted in FIG. 1.
Figure 6:
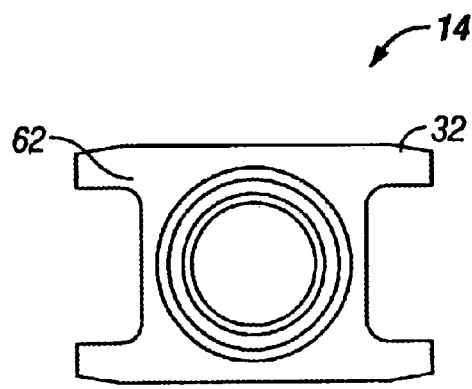
FIG. 6 is a bottom plan view of the nut depicted in FIG. 1.

With reference now to FIGS. 4–6, the upstanding portion 34 is centered on the base 32 of the nut 14. The nut defines a centered bore 68 that includes internal threads 70. The upstanding portion is generally tubular having an upper section 72 and a lower section 74. In this embodiment, the outer diameter of the upper section is less than the diameter of the lower section, and it is the upper section that engages the protuberances 36 as the nut is inserted into the cage 16.

The base includes four prongs extending from each corner. Once captive in the cage, the corresponding forward prongs may extend out the forward opening of the cage and the upper section of the upstanding portion extends, at least partially, out of the recess 30, and the aforementioned are appropriately sized to facilitate some freedom of movement for the nut while still captive. Such movement aids the nut in adjustably receiving and securing the bolt.

With reference now to FIGS. 7 and 8, another preferred embodiment of a clip nut 10' having a plastic body 12' and nut 14 is shown. The bodies 12, 12' are similarly configured. In this embodiment, the upper wall 24' is angled in alignment with the rearward portion 52' of the first arm, to aid in receiving the nut into the nut cage 16'. In various embodiments, the angle of the upper wall can be tailored for particular uses, for example, to be oriented parallel to a mounting panel in light of a prescribed amount of force exerted by a bolt causing deflection of the first arm and/or the aft portion.

With reference now to FIGS. 9 and 10, yet another preferred embodiment of a clip nut 10" having a plastic body 12" and nut 14 is shown. This body too is similarly configured to the previously discussed bodies. In this embodiment, the length of the aft section 22" is greater than the others, to provide more clearance between the first and second arms. This enables the body to accommodate thicker mounting panels.

It should be appreciated from the foregoing description that an improved clip nut is provided a clip nut having a plastic body holding captive a nut. The body includes two aligned arms projecting from an aft section, each arm defining an aperture a forward portion of the arm. The nut includes a base and a upstanding portion extending from the base that defines an internally threaded bore. The body further includes a nut cage positioned disposed about the aperture of the first arm. The nut cage includes an upper wall spaced above the first arm that defines a slot having a narrowed inlet and a recess aligned with the apertures of the first and second arms. The body is configured to readily and securely receive the nut. To insert the nut into the cage, the nut is forced against the nut cage such that the upstanding portion presses into and past the narrowed inlet. In this manner, the cage yieldably receives the nut without undue manipulation of either piece.

The foregoing detailed description of the present invention is provided for the purposes of illustration and is not intended to be exhaustive or to limit the invention to the precise embodiments disclosed. Accordingly, the scope of the present invention is defined by the following claims.

I claim:

1. A clip nut comprising:
   a plastic body having
      an aft section,
      a first arm extending from the aft section, the first arm having a forward portion and a rearward portion angled relative to the forward portion, the forward portion defining an aperture,
      a second arm extending from the aft section generally in alignment with the first arm and defining an aperture aligned with the aperture of the first arm, and
      a nut cage positioned atop the first arm and disposed about the aperture of the first arm, the nut cage having an upper wall spaced above the first arm that defines a slot having a narrowed inlet and a recess aligned with the apertures of the first and second arms, wherein the upper wall of the nut cage is generally parallel to the rearward portion of the first arm; and a nut having a base and an upstanding portion extending from the base that defines an internally threaded bore; wherein the slot of the nut cage is sized to yieldably receive the nut past the narrow inlet and into the recess.

2. A clip nut as defined in claim 1, wherein the narrowed inlet opens in an aft direction.

3. A clip nut as defined in claim 1, wherein the second arm includes an upstanding flange encircling the aperture of the second arm, an aft portion of the flange having a greater height than a forward portion thereof.

4. A clip nut as defined in claim 1, wherein the nut cage has a front wall that defines a recess sized to receive a front portion of the base of the nut.

5. A clip nut as defined in claim 1, wherein the nut cage has a front wall extending upwardly from a portion forward of the aperture of the first arm and a pair of side walls extending upwardly from opposing sides of the first arm, wherein the upper wall is positioned atop the front and side walls.

6. A clip nut as defined in claim 1, wherein the narrowed inlet is defined to have a width less than an outer diameter of a corresponding region of the nut's upstanding portion, such that the nut cage must deflect for the nut to pass through the narrowed inlet to the recess.

7. A clip nut as defined in claim 1, wherein the upper wall of the nut cage includes a pair of inwardly facing protuberances in confronting relationship to define the narrowed inlet, each protuberance has a leading edge and the leading edges are generally symmetrical to one another about a line bisecting the narrowed inlet.

8. A clip nut as defined in claim 7, wherein the leading edges of the protuberances each include a first portion angled toward the bisecting line, and a second portion generally parallel to the bisecting line and positioned between the first portion and the recess, wherein the recess has a generally circular cross-section as viewed from above the nut cage.

9. A clip nut as defined in claim 7, wherein the closest distance between the leading edges of the protuberances is less than the diameter at a corresponding region of the upstanding portion of the nut, such that the nut cage must deflect for the nut to pass through the narrowed inlet of the slot.

10. A clip nut comprising:
 a plastic body having.
  an aft section,
  a first arm extending from the aft section, defining an aperture in a forward portion of the arm, and having a rearward portion angled relative to the forward portion,
  a second arm extending from the aft section generally in alignment with the first arm and defining an aperture axially aligned with the aperture of the first arm, and
  a nut cage positioned atop the first arm and disposed about the aperture of the first arm, the nut cage having a front wall extending upwardly from the first arm, a pair of side walls extending upwardly from opposing sides of the first arm, and an upper wall is positioned atop the front and side walls, the upper wall defining a slot having a narrowed inlet and a recess axially aligned with the apertures of the first and second arms, wherein the upper wall of the nut cage is generally parallel to the rearward portion of the first arm; and
 a nut having a base and a upstanding portion extending from the base that defines an internally threaded bore; wherein the slot of the nut cage is sized to yieldably receive the nut past the narrow inlet and into the recess.

11. A clip nut as defined in claim 10, wherein the second arm includes an upstanding flange encircling the aperture of the second arm, an aft portion of the flange having a greater height than a forward portion thereof.

12. A clip nut as defined in claim 10, wherein the narrowed inlet is defined to have a width less than an outer diameter of a corresponding region of the nut's upstanding portion, such that the nut cage must deflect for the nut to pass through the narrowed inlet to the recess.

13. A clip nut as defined in claim 10, wherein the upper wall of the nut cage includes a pair of inwardly facing protuberances in confronting relationship to define the narrowed inlet, each protuberance has a leading edge and the leading edges are generally symmetrical to one another about a line bisecting the narrowed inlet.

14. A clip nut as defined in claim 13, wherein the leading edges of the protuberances each include a first portion angled toward the bisecting line, and a second portion generally parallel to the bisecting line and positioned between the first portion and the recess, wherein the recess has a generally circular cross-section as viewed from above the nut cage.

15. A clip nut as defined in claim 13, wherein the closest distance between the leading edges of the protuberances is less than the diameter at a corresponding region of the upstanding portion of the nut, such that the nut cage must deflect for the nut to pass through the narrowed inlet of the slot.

16. A clip nut as defined in claim 13, wherein the narrowed inlet opens in an aft direction.

* * * * *